(12) United States Patent
Risco et al.

(10) Patent No.: US 11,205,065 B2
(45) Date of Patent: Dec. 21, 2021

(54) GESTURE DETECTION IN EMBEDDED APPLICATIONS

(71) Applicant: Alpine Electronics of Silicon Valley, Inc., Santa Clara, CA (US)

(72) Inventors: Diego Rodriguez Risco, San Jose, CA (US); Samir El Aouar, Sunnyvale, CA (US); Alexander Joseph Ryan, Mountain View, CA (US)

(73) Assignee: ALPINE ELECTRONICS OF SILICON VALLEY, INC., Santa Clara, CA (US)

( * ) Notice: Subject to any disclaimer, the term of this patent is extended or adjusted under 35 U.S.C. 154(b) by 90 days.

(21) Appl. No.: 16/657,850

(22) Filed: Oct. 18, 2019

(65) Prior Publication Data

US 2021/0117660 A1    Apr. 22, 2021

(51) Int. Cl.
*G06K 9/00* (2006.01)
*G06F 3/01* (2006.01)
*G06T 7/269* (2017.01)
*G06N 3/04* (2006.01)

(52) U.S. Cl.
CPC ......... *G06K 9/00355* (2013.01); *G06F 3/017* (2013.01); *G06N 3/04* (2013.01); *G06T 7/269* (2017.01); *G06T 2207/10016* (2013.01); *G06T 2207/10024* (2013.01); *G06T 2207/20084* (2013.01); *G06T 2207/20221* (2013.01); *G06T 2207/30196* (2013.01)

(58) Field of Classification Search
CPC ................ G06K 9/00355; G06T 7/269; G06T 2207/10016; G06T 2207/10024; G06T 2207/20084; G06T 2207/20221; G06T 2207/30196; G06F 3/017; G06N 3/04
USPC ....................................................... 382/103
See application file for complete search history.

(56) References Cited

U.S. PATENT DOCUMENTS 8,639,042 B2 * 1/2014 Liu .................... G06T 7/246
                                            382/224

OTHER PUBLICATIONS

Verma, Bindu, and Ayesha Choudhary. "Dynamic Hand Gesture Recognition using Convolutional Neural Network with RGB-D Fusion." Proceedings of the 11th Indian Conference on Computer Vision, Graphics and Image Processing. 2018. (Year: 2018).*
Chun, Qiuping, and Erhu Zhang. "Human action recognition based on improved motion history image and deep convolutional neural networks." 2017 10th International Congress on Image and Signal Processing, BioMedical Engineering and Informatics (CISP-BMEI). IEEE, 2017. (Year: 2017).*

(Continued)

*Primary Examiner* — Jonathan S Lee
(74) *Attorney, Agent, or Firm* — Perkins Coie LLP

(57) ABSTRACT

Disclosed herein are systems, devices, and processes for gesture detection. A method includes capturing a series of images. The method includes generating motion isolation information based on the series of images. The method includes generating a composite image based on the motion isolation information. The method includes determining a gesture based on the composite image. The processes described herein may include the use of convolutional neural networks on a series of time-related images to perform gesture detection on embedded systems or devices.

9 Claims, 19 Drawing Sheets

(56) References Cited

OTHER PUBLICATIONS

Maret, Yann, Daniel Oberson, and Marina Gavrilova. "Real-time embedded system for gesture recognition." 2018 IEEE International Conference on Systems, Man, and Cybernetics (SMC). IEEE, 2018. (Year: 2018).*

Zhang, Erhu, et al. "Fusion of 2d cnn and 3d densenet for dynamic gesture recognition." Electronics 8.12 (2019): 1511. (Year: 2019).*

Davis, James, and Gary Bradski. "Real-time motion template gradients using Intel CVLib." IEEE ICCV Workshop on Framerate Vision. 1999. (Year: 1999).*

Ma, Li, Kaihua Wu, and L. Zhu. "Fire smoke detection in video images using Kalman filter and Gaussian mixture color model." 2010 International Conference on Artificial Intelligence and Computational Intelligence. vol. 1. IEEE, 2010. (Year: 2010).*

Hu, Zhongxu, et al. "3D separable convolutional neural network for dynamic hand gesture recognition." Neurocomputing 318 (2018): 151-161. (Year: 2018).*

Lim, Kian Ming, et al. "Isolated sign language recognition using convolutional neural network hand modelling and hand energy image." Multimedia Tools and Applications 78.14 (2019): 19917-19944. (Year: 2019).*

\* cited by examiner

GESTURE DETECTION IN EMBEDDED APPLICATIONS

TECHNICAL FIELD

This patent document relates to systems, devices, and processes for performing gesture detection in embedded applications.

BACKGROUND

Techniques exist for detecting gestures from a user. These techniques often involve detecting a predefined user movement in order to effectuate a command. These techniques may employ infrared sensing, radar, or other remote sensing technology.

SUMMARY

Disclosed herein are systems, devices, and processes for gesture detection. A method includes capturing a series of images. The method includes generating motion isolation information based on the series of images. The method includes generating a composite image based on the motion isolation information. The method includes determining a gesture based on the composite image. The processes described herein may include the use of convolutional neural networks on a series of time-related images to perform gesture detection on embedded systems or devices.

DETAILED DESCRIPTION

In gesture detection applications, a system attempts to detect when a user performs some particular gesture or gestures. Depending on the application, there may be a predefined set of gestures that the system attempts to detect. When a gesture is detected, the system then may control operations of some electronic device or system. Thus gesture detection is often, though not always, employed as a way to all a user to provide commands to a system without having a touch interface, audio interface, or other interface.

Figure 1:
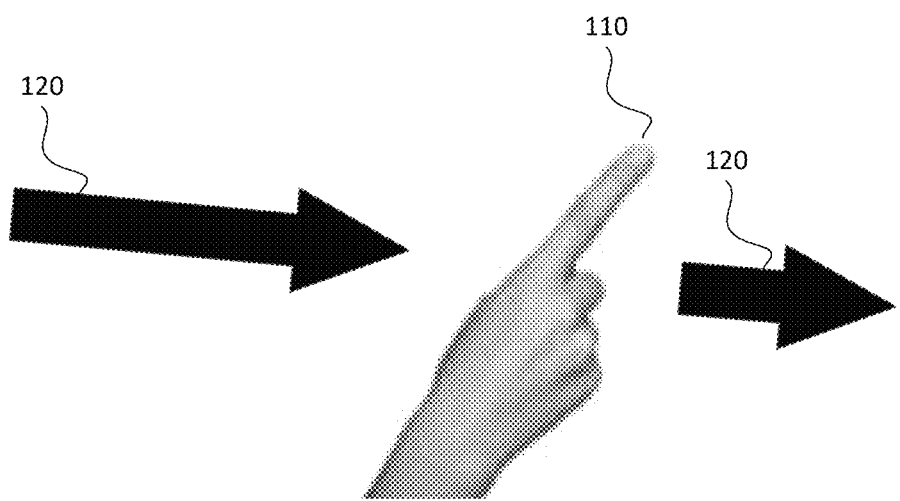
FIG. 1 is a diagram of gesture detection according to some embodiments of the present disclosure.

As an example, FIG. 1 is a diagram of gesture detection according to some embodiments of the present disclosure. A system may be configured to detect a "point to the right" gesture by a user's hand 110. This gesture may be predefined to cause the system to perform a "next" operation (e.g., skipping to the next track in an audio playlist; changing to the next channel in a television; displaying the next item in a list). Thus the system may attempt to detect a left-to-right motion 120 of the user's hand. A gesture detection system may use a variety of sensing technologies to detect the movement of the user's hand 110, such as by using an electromagnetic wave emitter and receiver that work together in a radar arrangement.

The present inventors recognize that it would be beneficial to use an artificial neural network to perform gesture detection. Artificial neural networks are highly effective at detecting patterns in input data. This is true even in the presence of variations in the input data. Gesture detection requires the detection of patterns in input data (e.g., a general motion of the user's hand), despite variations in the input data (e.g., variations in the trajectory of the user's hand). Artificial neural networks' effectiveness in this respect make them effective both for not missing a user-signaled gesture, and also for allowing more complex and/or granular gestures (e.g., swiping a little to the right goes to the next chapter in the movie, while swiping a lot to the right goes to the next movie). Furthermore, it would be beneficial to perform the gesture detection using images, because many neural network training and use algorithms already exist for processing image input data. Further, a wide variety of image sensors are available (e.g., low cost mini cameras; 4K cameras; etc.) and thus can be used in nearly any environment where gesture detection is desired.

But the present inventors recognize that certain problems exist for trying to use artificial neural networks to perform gesture detection on image data input.

First, some types of neural networks that are well-suited to the image classification problem are not well-suited to the gesture detection context based on image data input. For example, convolutional neural networks are well-suited to the image classification problem, at least in part because the convolution layer of the artificial neural network is highly effective at extracting, while still abstracting, the relevant features in an image. But convolutional neural networks are not well-suited to the gesture detection context based on image data input. Namely, convolutional neural networks do not have feedback loops in their hidden layers, and as such convolutional neural networks have no "memory." Stated another way, a convolutional neural network is effective at detecting a pattern in a single image, but convolutional neural networks have no way to detect patterns in a series of time-related images. And using image data as the input for gesture detection requires analyzing a series of images in order to detect a predefined gesture (e.g., movement of the user's hand).

Second, some types of neural networks that are well-suited to the gesture detection context based on image data input are not well-suited to certain environments in which gesture detection would be desired. For example, recurrent neural networks do have feedback loops in their hidden layers, and thus recurrent neural networks do have "memory." That is, recurrent neural networks are capable of detecting patterns in a series of time-related images. But a recurrent neural network also requires significantly more computing resources to train and apply. For instance, recurrent neural networks require significantly more processor resources (e.g., number of processors and/or processor time to train and/or apply), more memory (e.g., more data storage while training and/or applying the neural network), and more energy (e.g., more power drain due to the use of more processor and memory resources). While this may be fine in some contexts, like cloud computing, this is not feasible in many environments where gesture detection would be desired. For instance, gesture detection is often desired in embedded applications, where computing resources are limited (e.g., less memory capacity, less powerful processor), power supply is limited (e.g., battery power), access to the cloud is limited (e.g., no Internet connection; limited bandwidth Internet connection; etc.), and tolerance for delay is minimal (e.g., no time to send images to the cloud for processing because user desires to change song instantaneously). Thus the effectiveness of recurrent neural network is mitigated by their inability to be used in many environments.

Figure 2:
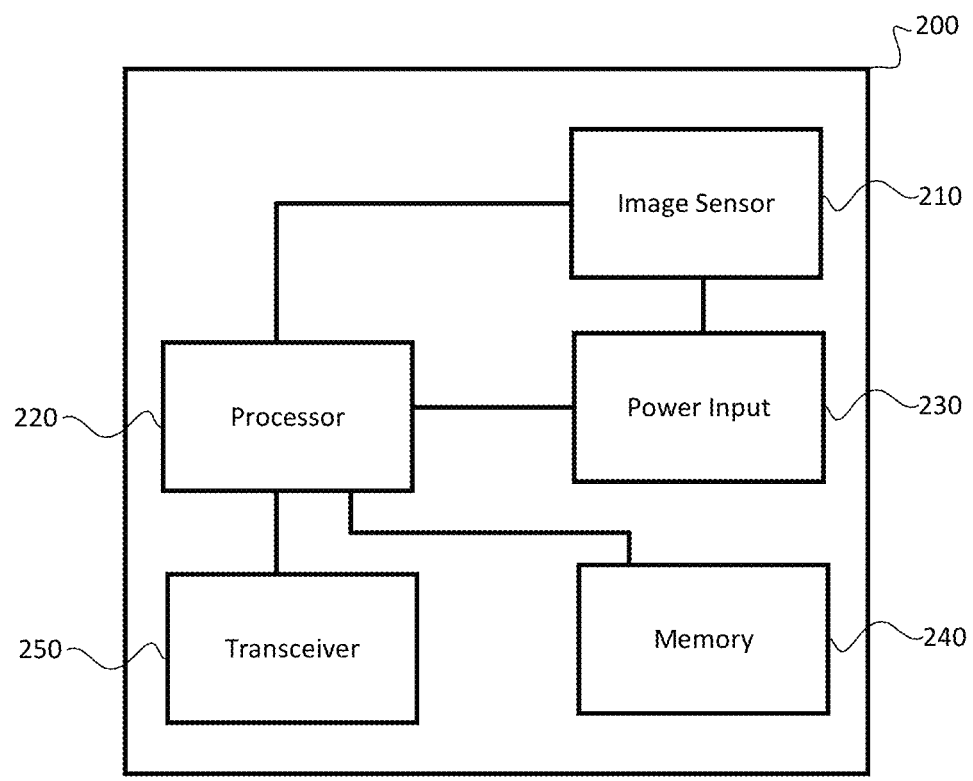
FIG. 2 is a block diagram of a system according to some embodiments of the present disclosure.

FIG. 2 is a block diagram of a system 200 according to some embodiments of the present disclosure. The system 200 may be an embedded system. The system 200 may be a component in a larger embedded system.

The system 200 may include an image sensor 210. The image sensor 210 may be capable of capturing image data of a vicinity of the system 200. For example, image sensor 210 may be a camera. Alternatively, image sensor 210 may be part of a camera component or apparatus. Image sensor 210 may be capable of capturing a series of images over time, such as by video capture or otherwise. Image sensor 210 may be provided in different ways in various embodiments.

The system 200 may include a processor 220. The processor 220 may be capable of processing image data captured by the image sensor 210. For example, the processor 220 may modify existing image data and/or generate new image data in order to isolate motion in one or more images, as described elsewhere herein. As another example, the processor 220 may modify existing image data and/or generate new image data in order to generate a sequence of images that are coded in a color scale to reflect the timing of motion reflected therein, as described elsewhere herein. As another example, the processor 220 may generate a composite image that contains motion information from a series of images, as described elsewhere herein. As another example, the processor 220 may train an artificial neural network structure, as described elsewhere herein. As another example, the processor 220 may apply image input data (e.g., a composite image) to an artificial neural network structure, as described elsewhere herein.

The processor 220 may be capable of other operations. For example, the processor 220 may be capable of transmitting a command to a controller based on a gesture detected using an artificial neural network. the processor 220 may be capable of performing general computation tasks for the system 200, a larger system of which system 200 is a component, or otherwise.

The processor 220 may be provided as any one of the processor structures well-known in the field. A skilled artisan in the art will recognize that the term processor identifies a well-understood class of structures. The processor 220 may be provided as any one of these structures. For example, the processor 220 may be provide as a central processing unit (CPU), a graphics processing unit (GPU), a system-on-a-chip (SoC), or a microcontroller.

The system 200 may include additional components, such as a power input 230, a memory 240, and/or a transceiver 250.

The system 200 may include a power input 230. The system 200 may use the power input 230 to provide electric energy to other components of the system 230. The power input 230 may be provided in various forms, such as battery, a direct current input line, an alternating current input line, an alternating current input line with rectifier, or others. In embodiments where system 200 is an embedded system or a component in a larger embedded system, power input 230 may be provided as a battery.

The system 200 may include a memory 240. The system 200 may use the memory 240 to store data used by image sensor 210 and/or processor 220. For example, the memory 240 may store image data generated by image sensor 210. The memory 240 may store training data used by the processor 220 to train an artificial neural network structure. The memory 240 may store image data generated by the processor 220 as part gesture detection processes, as described elsewhere herein. In embodiments where system 200 is an embedded system or a component in a larger embedded system, the memory 240 may be a limited-capacity memory device (e.g., having no more than 4 GB storage capacity; having no more than 1 GB storage capacity; having no more than 256 MB storage capacity).

The system 200 may include a transceiver 250. The system 200 may use transceiver 250 to transmit and/or receive data with other devices. For example, the transceiver 250 may communicatively connect the system 200 to an external controller (e.g., an automobile controller; a multimedia controller; a domestic appliance controller). The processor 220 may transmits commands to such a controller using transceiver 250. The system 200 may use the transceiver 250 to transmit and/or receive artificial neural network parameters with an external device (e.g., a remote computing device; a server; a cloud computer; etc.). The system 200 may use the transceiver 250 to transmit and/or receive image data with an external device (e.g., a remote computing device; a server; a cloud computer; etc.). In embodiments where system 200 is an embedded system or a component in a larger embedded system, the transceiver 250 may communicate with external devices over a limited-bandwidth connection. In embodiments where system 200 is an embedded system or a component in a larger embedded system, the transceiver 250 may communicate with external devices over in intermittent connection (e.g., having no guaranteed connection at any point in time). In embodiments where system 200 is an embedded system or a component in a larger embedded system, the transceiver 250 may not communicate with any devices external to the embedded system. In embodiments where system 200 is an embedded system or a component in a larger embedded system, the system 200 may not include transceiver 250.

FIGS. 3A, 3B, 3C, and 3D are diagrams of gesture detection according to some embodiments of the present disclosure.

Figure 3A:
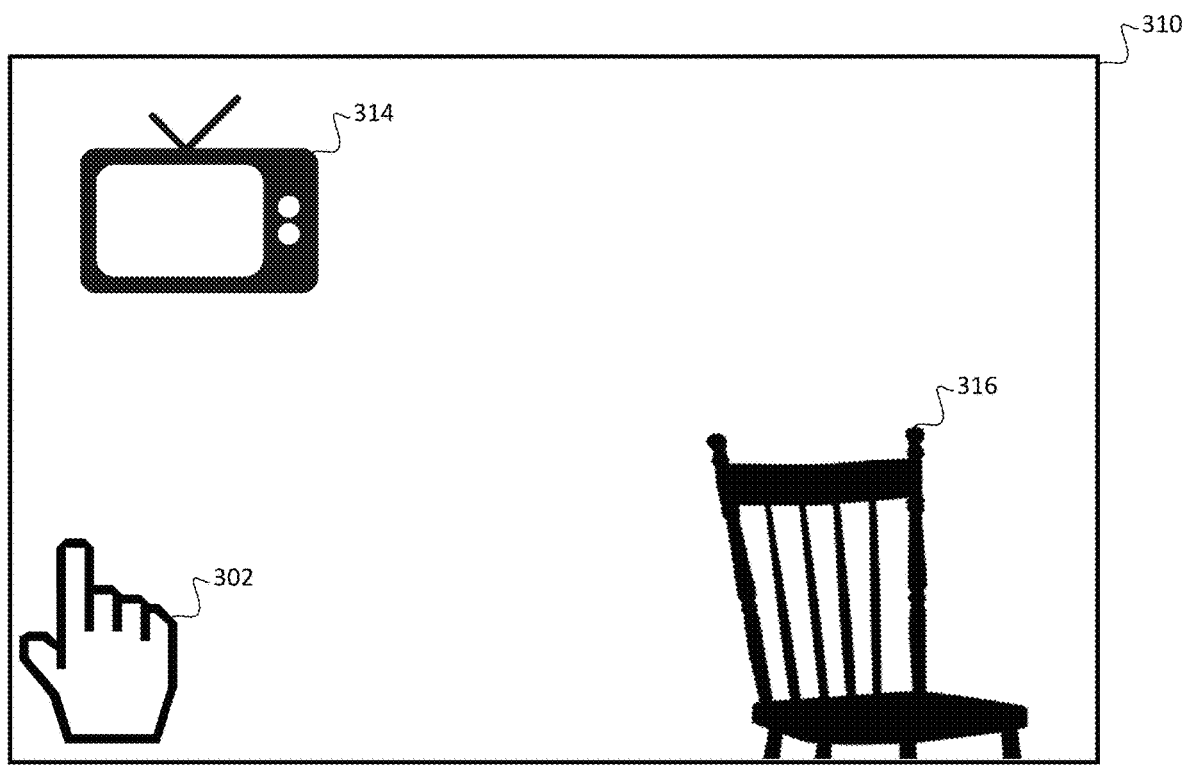
FIG. 3A is a diagram of gesture detection according to some embodiments of the present disclosure.

FIG. 3A depicts an image 310 captured by an image sensor (e.g., image sensor 210). Image 310 captures a scene in which a user may make a gesture. Image 310 captures a hand 302 of a user. Image 310 also captures various objects in a scene, such as a television 314 and a chair 316.

Figure 3B:
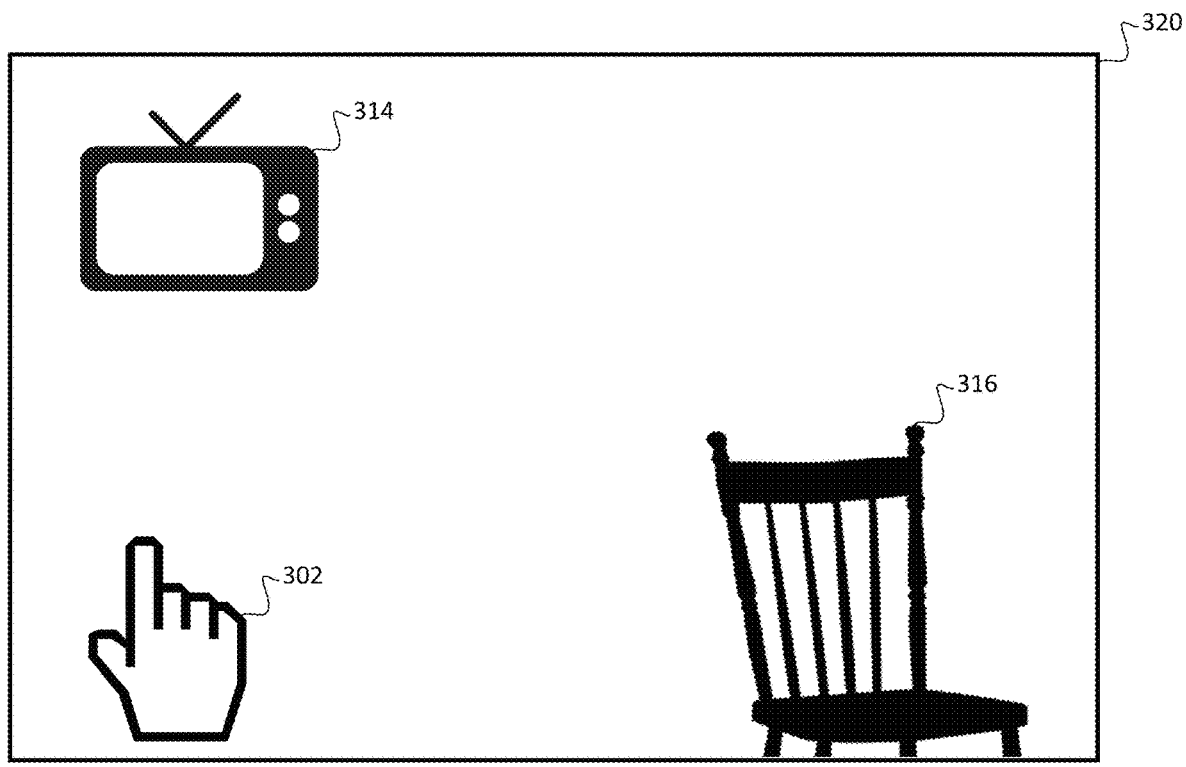
FIG. 3B is a diagram of gesture detection according to some embodiments of the present disclosure.

FIG. 3B depicts an image 320 captured by an image sensor (e.g., image sensor 210). Image 320 captures the scene as the image 310. Namely, image 320 captures the hand 302, the television 314, and the chair 316. However, image 320 is captured at a point in time after image 310 is captured. And the user is moving his hand 302 to the right. As such, hand 302 is displaced to the right in image 320 as compared to the location of hand 302 in image 310. In some embodiments, images 310 and 320 may be sequential frames captured by the image sensor (e.g., sequential frames in a video stream). In some embodiments, images 310 and 320 may be non-sequential frames captured by the image sensor.

Figure 3C:
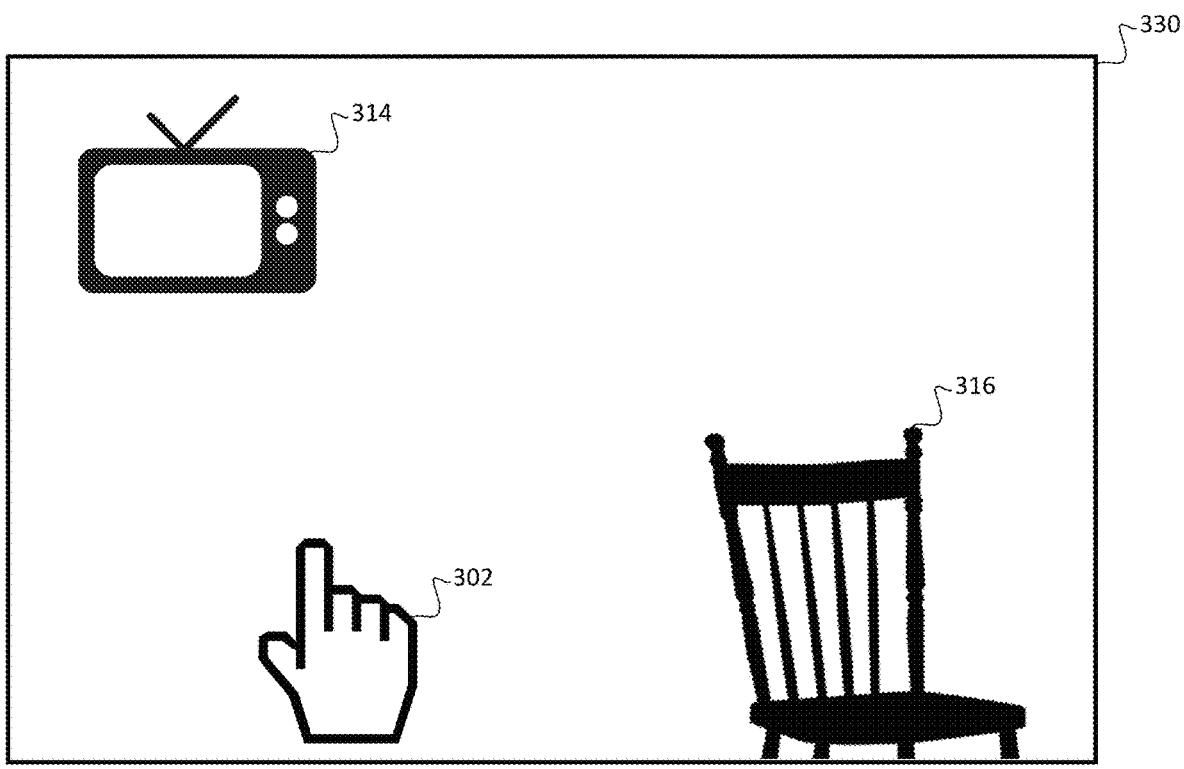
FIG. 3C is a diagram of gesture detection according to some embodiments of the present disclosure.

FIG. 3C depicts an image 330 captured by an image sensor (e.g., image sensor 210). Image 330 captures the scene as the images 310 and 320. Namely, image 330 captures the hand 302, the television 314, and the chair 316. However, image 330 is captured at a point in time after images 310 and 320 are captured. And the user is moving his hand 302 to the right. As such, hand 302 is displaced to the right in image 330 as compared to the location of hand 302 in images 310 and 320. In some embodiments, images 320 and 330 may be sequential frames captured by the image sensor (e.g., sequential frames in a video stream). In some embodiments, images 320 and 330 may be non-sequential frames captured by the image sensor.

Figure 3D:
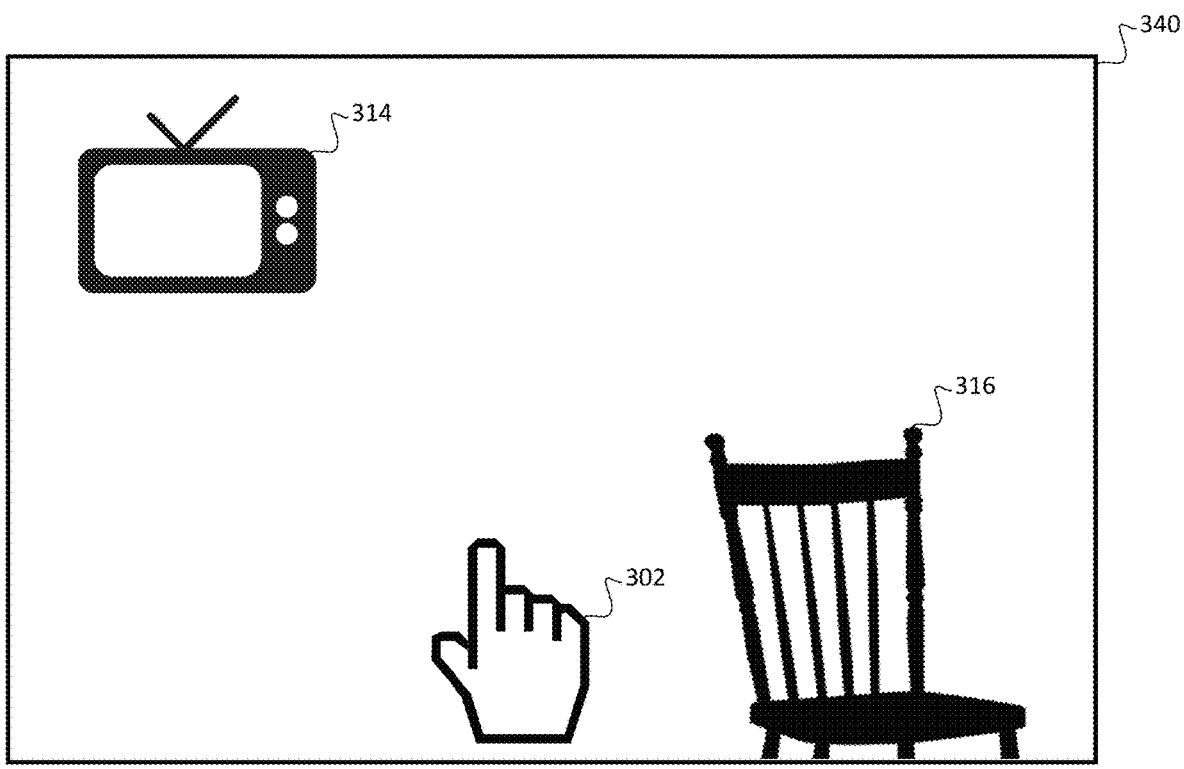
FIG. 3D is a diagram of gesture detection according to some embodiments of the present disclosure.

FIG. 3D depicts an image 340 captured by an image sensor (e.g., image sensor 210). Image 340 captures the scene as the images 310, 320, and 330. Namely, image 340 captures the hand 302, the television 314, and the chair 316. However, image 340 is captured at a point in time after images 310, 320, and 330 are captured. And the user is moving his hand 302 to the right. As such, hand 302 is displaced to the right in image 340 as compared to the location of hand 302 in images 310, 320, and 330. In some embodiments, images 330 and 340 may be sequential frames captured by the image sensor (e.g., sequential frames in a video stream). In some embodiments, images 330 and 340 may be non-sequential frames captured by the image sensor.

Figure 4A:
FIG. 4A is a diagram of gesture detection according to some embodiments of the present disclosure.
Figure 4B:
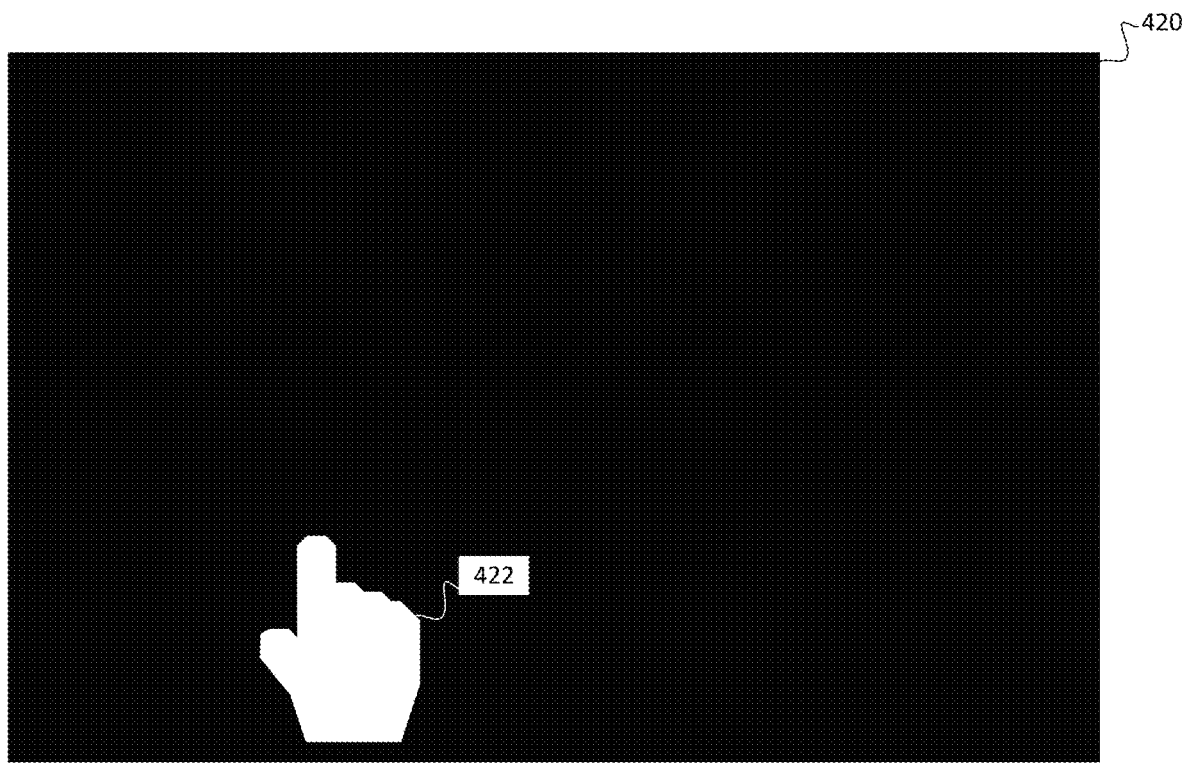
FIG. 4B is a diagram of gesture detection according to some embodiments of the present disclosure.
Figure 4C:
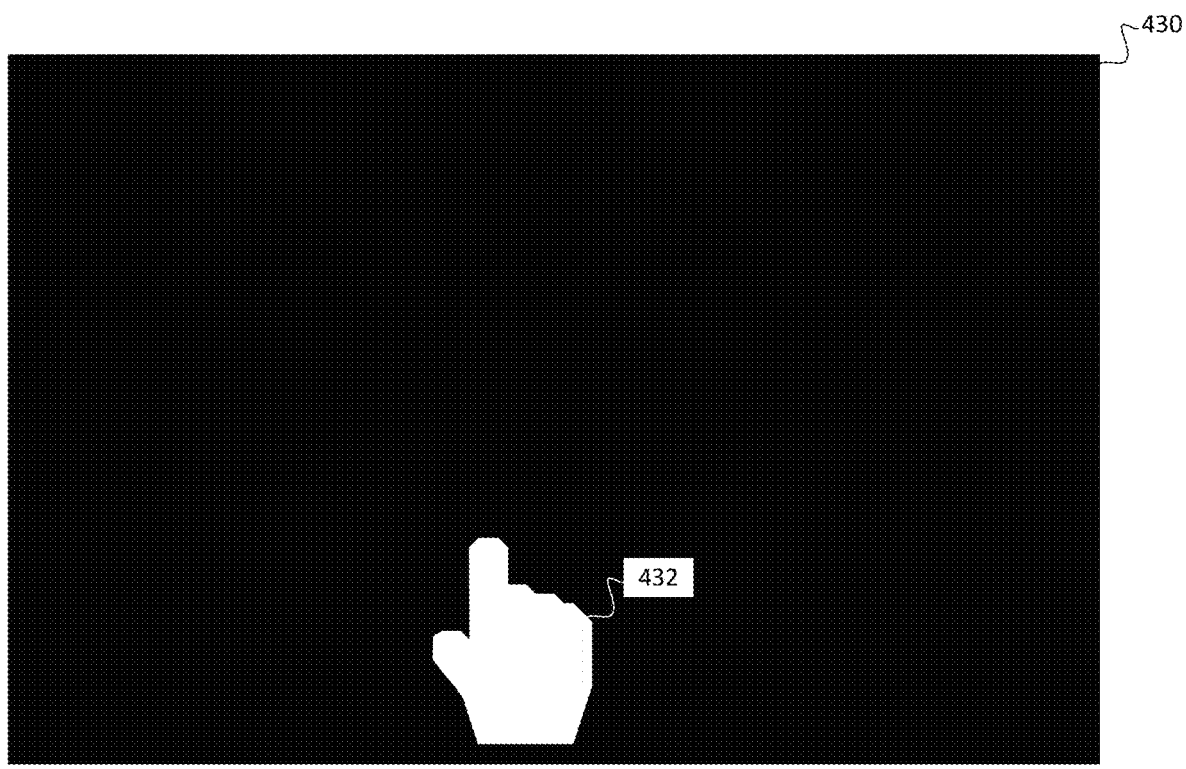
FIG. 4C is a diagram of gesture detection according to some embodiments of the present disclosure.

FIGS. 4A, 4B, and 4C are diagrams of gesture detection according to some embodiments of the present disclosure.

FIG. 4A depicts an image 410 generated by a processor (e.g., processor 220). Image 410 isolates the motion reflected in the images 310 and 320. Namely, the data in image 410 identifies portions of the image 320 that have different pixel data than like-positioned portions of image 310. This may reflect which portions of the image 320 reflect motion versus which portions of the image 320 are static between images 310 and 320. Between images 310 and 320, the only motion was the movement of the hand 302 displacing to the right. As such, image 410 includes an image portion 412 with pixel data that is different from the pixel data in other portions of the image 410, with those other portions remaining static between images 310 and 320. For example, image portion 412 may be entirely white (e.g., pixel values of 255 on a 256-bit greyscale). Continuing the example, the other portions of the image 410 may be entirely black (e.g., pixel values of 0 on a 256-bit greyscale).

The image 410 can be generated in different ways in various embodiments. In some embodiments, the image 410 may be generated by performing an image subtraction or "diff" between images 310 and 320. For example, for any given pixel at position (x, y) in image 410, the pixel value (e.g., between 0 and 255 on a 256-bit greyscale) may be calculated by subtracting the value of the pixel at position (x, y) in image 310 from the value of the pixel at position (x, y) in image 320. The value of the pixel in image 410 may be set to the absolute value of this subtraction operation. This subtraction operation may be computed for all pixel positions in image 410. As a result of this process, pixels in the image 410 may have small values (e.g., close to zero) for portions that are static between images 310 and 320 (e.g., because the pixel values are nearly the same). Pixels in the image 410 may have large values (e.g., close to 255) for portions that are in motion between images 310 and 320 (e.g., because the pixel values are very different). In this way, the pixel values of the image 410 may isolate motion that occurred between the images 310 and 320. The image 410 may be calculated in other ways in various embodiments.

In some embodiments, the image 410 may be generated in part based on performance of a flattening operation. For example, if image 410 is initially calculated using a difference operation as just described, then image 410 may contain some pixels that have very small values (static portions) and some pixels that have very large values (motion portions). But there may be relatively few pixels that have values of 0 or 255, due to minor variations in pixel capture for static portions or like portions that are in motion. But these minor variations may not provide significant information to the gesture detection process, as described elsewhere herein. As such, the image 410 may be simplified by flattening the pixel values to either 0 or 255. For example, a pixel value that is below a predetermined threshold (e.g., a pixel value of 32) may be set to zero instead. Continuing the example, a pixel value that is above a predetermined threshold (e.g., a pixel value of 223) may be set to 255. As another example, all pixels with values below 256 may be set to zero, while all pixels with values at or above 128 may be set to 255. In some embodiments, the image 410 may be flattened to more than to pixel values (e.g., eight possible pixel values with predetermined thresholds in 32 pixel intervals).

FIG. 4B depicts an image 420 generated by a processor (e.g., processor 220), in a manner similar to that just described for image 410. However, image 420 isolates the motion reflected in the images 320 and 330. Namely, the data in image 420 identifies portions of the image 330 that have different pixel data than like-positioned portions of image 320. As such, image 420 includes an image portion 422 reflecting the continued movement of the hand 302 displacing to the right.

FIG. 4C depicts an image 430 generated by a processor (e.g., processor 220), in a manner similar to that just described for images 410 and 420. However, image 430 isolates the motion reflected in the images 330 and 340. Namely, the data in image 430 identifies portions of the image 340 that have different pixel data than like-positioned portions of image 330. As such, image 430 includes an image portion 432 reflecting the continued movement of the hand 302 displacing to the right.

Images 410, 420, and 430 may be generated using different techniques in various embodiments.

Figure 5A:
FIG. 5A is a diagram of gesture detection according to some embodiments of the present disclosure.
Figure 5B:
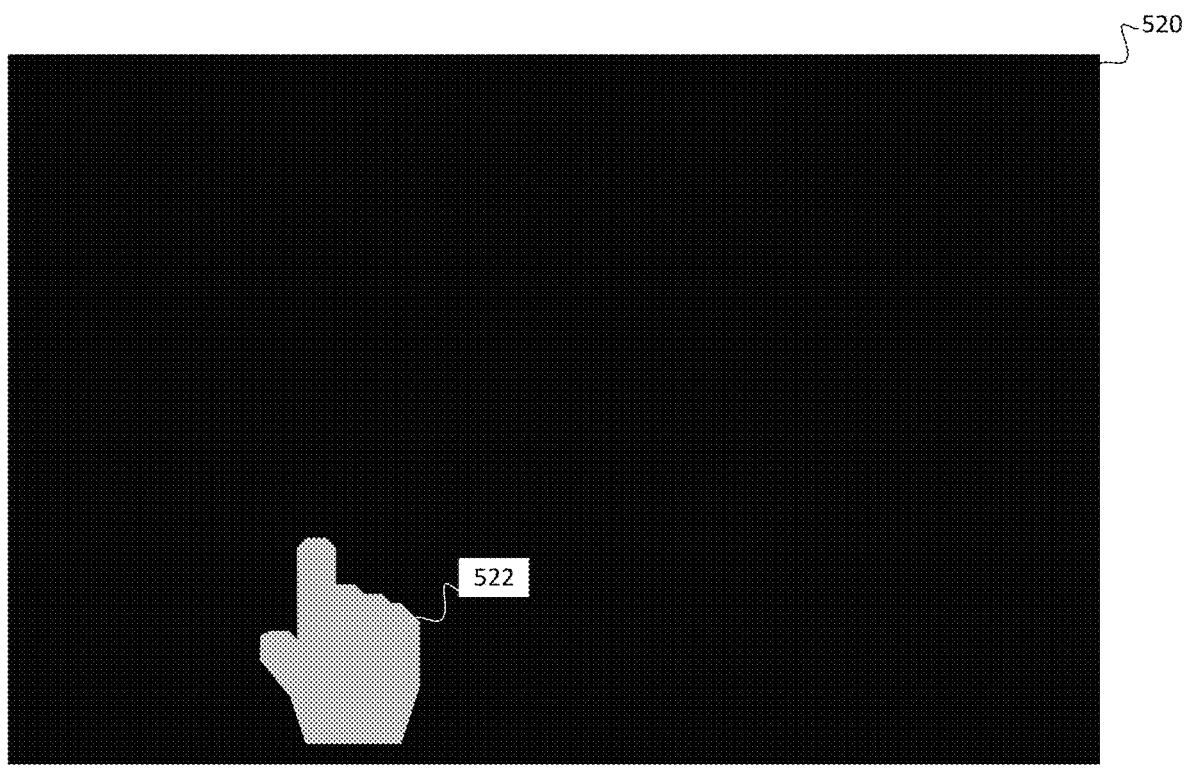
FIG. 5B is a diagram of gesture detection according to some embodiments of the present disclosure.
Figure 5C:
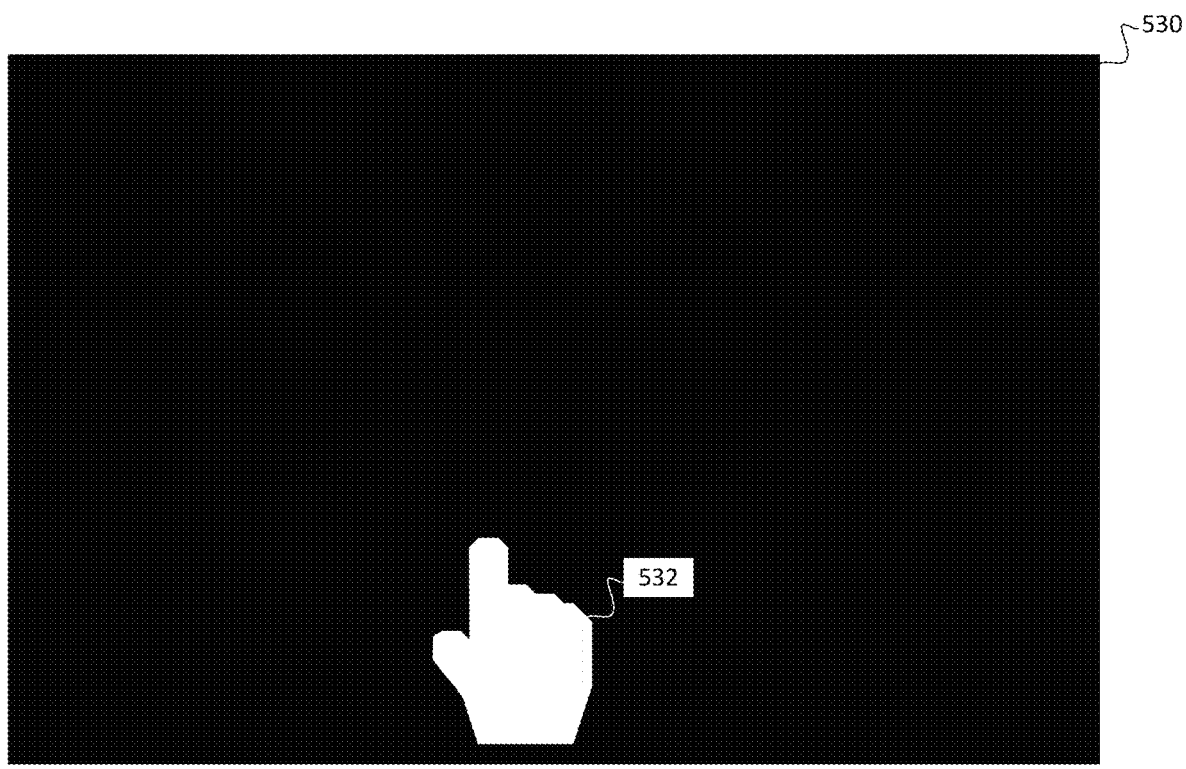
FIG. 5C is a diagram of gesture detection according to some embodiments of the present disclosure.

FIGS. 5A, 5B, and 5C are diagrams of gesture detection according to some embodiments of the present disclosure.

FIG. 5A depicts an image 510 generated by a processor (e.g., processor 220). Image 510 may be generated based on image 410. For example, image 510 may contain the same pixel values as the image 410, except that the image portion 412 of image 410 that isolate motion between images 310 and 320 may now be transformed to image portion 512. For example, image portion 512 may include the same pixel positions in image 510 as the image portion 412 in image 410. But, whereas the pixel values of image portion 412 may have been a first set of values, the pixel values of image portion 512 may be a different set of values. For instance, while all pixel values in image portion 412 may be white (e.g., 255 on a 256-bit greyscale), all pixel values in image portion 512 may be an intermediate grey value (e.g., a value between 0 (exclusive) and 255 (exclusive) on a 256-bit greyscale). In one example, the pixels in image portion 512 may have pixel values of 85.

FIG. 5B depicts an image 520 generated by a processor (e.g., processor 220), in a manner similar to that just described for image 510. However, image 520 may be generated based on image 420. Image 520 contains an image portion 522 that may be generated based on a transformation of image portion 422, such as just described with respect to FIG. 5A. In one example, the pixels in image portion 522 may have pixel values of 170.

FIG. 5C depicts an image 530 generated by a processor (e.g., processor 220), in a manner similar to that just described for images 510 and 520. However, image 530 may be generated based on image 430. Image 530 contains an image portion 532 that may be generated based on a transformation of image portion 432, such as just described with respect to FIGS. 5A and 5B. In one example, the pixels in image portion 532 may have pixel values of 255.

The transformations used to generate images 510, 520, and 530 may be performed in different ways in various embodiments. For example, image portions 512, 522, and 532 may be generated by applying a color gradient. For instance, because there are three images in the series of images 410, 420, and 430, as well as a fourth color portion (e.g., black for static portions), a color gradient may be generated by dividing the color scale (e.g., 0 to 255 for 256-bit greyscale) into four even intervals. For instance, the intervals may be 0 to 84, 85 to 169, and 170 to 255. Based on these intervals four cutoff pixel values may be selected defining approximate boundaries of the intervals: 0, 85, 170, and 255. With black (e.g., pixel value zero) reserved for static portions, the remaining pixel values (e.g., pixel values 85, 170, 255) may be applied to the image portions 412, 422, and 432 to generate image portions 512, 522, and 532, respectively.

The color gradient may be applied sequentially following the chronological order of the images on which images 510, 520, and 530 are based. For example, a lowest pixel value (e.g., darkest grey) may be applied to the image portion in the oldest image in the series (i.e., image portion 512 in image 510). The next lowest pixel value (e.g., middle grey) may be applied to the image portion in the next oldest image in the series (i.e., image portion 522 in image 520). The next lowest pixel value (e.g., white) may be applied to the image portion in the next oldest image in the series (i.e., image portion 532 in image 530). Using such a technique, the gesture detection approach can generate a series of images that both isolate motion (e.g., contain data only in image portions here there is motion) and indicate the time-dependency (e.g., the chronological order) of the motion using in-image data (e.g., the color scale; pixel values).

Images 510, 520, and 530 may be generated using different techniques in various embodiments.

Figure 6A:
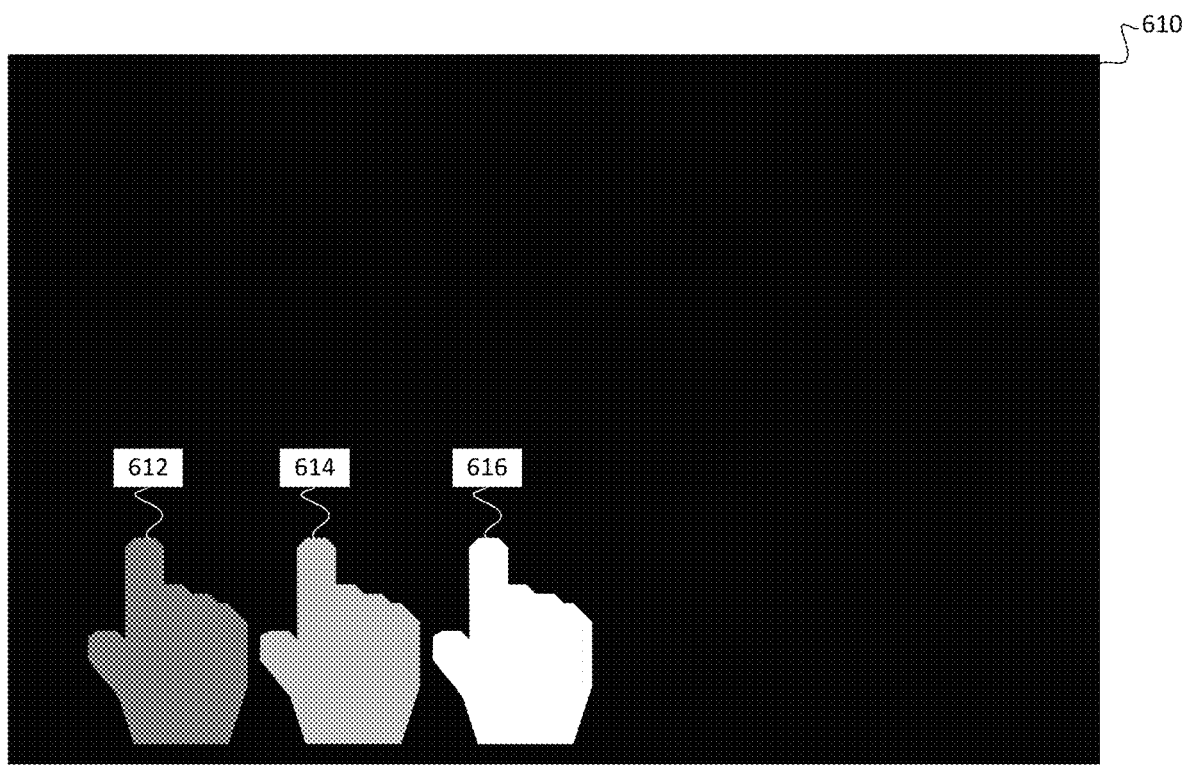
FIG. 6A is a diagram of gesture detection according to some embodiments of the present disclosure.

FIG. 6A is a diagram of gesture detection according to some embodiments of the present disclosure. FIG. 6A depicts an image 610 generated by a processor (e.g., processor 220). Image 610 may be generated based on images 510, 520, and 530. Image 610 may be a composite image of images 510, 520, and 530. Image 610 may be generated by merging or combining the image data of images 510, 520, and 530.

Image 610 includes images portion 612, image portion 614, and image portion 616. Image portions 612, 614, and 616 may be generated in a variety of ways. For example, image portion 612 may be generated be selecting the pixel positions and pixel values from image portion 512 in image 510 and copying those pixel values into the same pixel positions in image 610. Image portion 614 may be generated be selecting the pixel positions and pixel values from image portion 522 in image 520 and copying those pixel values into the same pixel positions in image 610. Image portion 616 may be generated be selecting the pixel positions and pixel values from image portion 532 in image 530 and copying those pixel values into the same pixel positions in image 610.

The generation of image 610 and its image portions 612, 614, and 616 may be performed in a predefined order.

For example, image 610 may be first generated by creating an all-black image (e.g., all pixels set to pixel value zero in a 256-bit greyscale). Next, all non-black portions of the oldest image among images 510, 520, and 530 (i.e., image 510) are copied into image 610 at the same pixel positions and with the same pixel values. Next, all non-black portions of the next oldest image among images 510, 520, and 530 (i.e., image 520) are copied into image 610 at the same pixel positions and with the same pixel values. Next, all non-black portions of the next oldest image among images 510, 520, and 530 (i.e., image 520) are copied into image 610 at the same pixel positions and with the same pixel values.

For example, image 610 may be first generated by creating an all-white image (e.g., all pixels set to pixel value 255 in a 256-bit greyscale). Next, all non-black portions of the oldest image among images 510, 520, and 530 (i.e., image 510) are copied into image 610 at the same pixel positions and with the same pixel values. Next, all non-black portions of the next oldest image among images 510, 520, and 530 (i.e., image 520) are copied into image 610 at the same pixel positions and with the same pixel values. Next, all non-black portions of the next oldest image among images 510, 520, and 530 (i.e., image 520) are copied into image 610 at the same pixel positions and with the same pixel values. Next, all pixel positions in image 610 for which a pixel value was not modified during the foregoing three copy operations may then be set to black (i.e., all un-altered pixel values set to zero in a 256-bit greyscale).

Figure 6B:
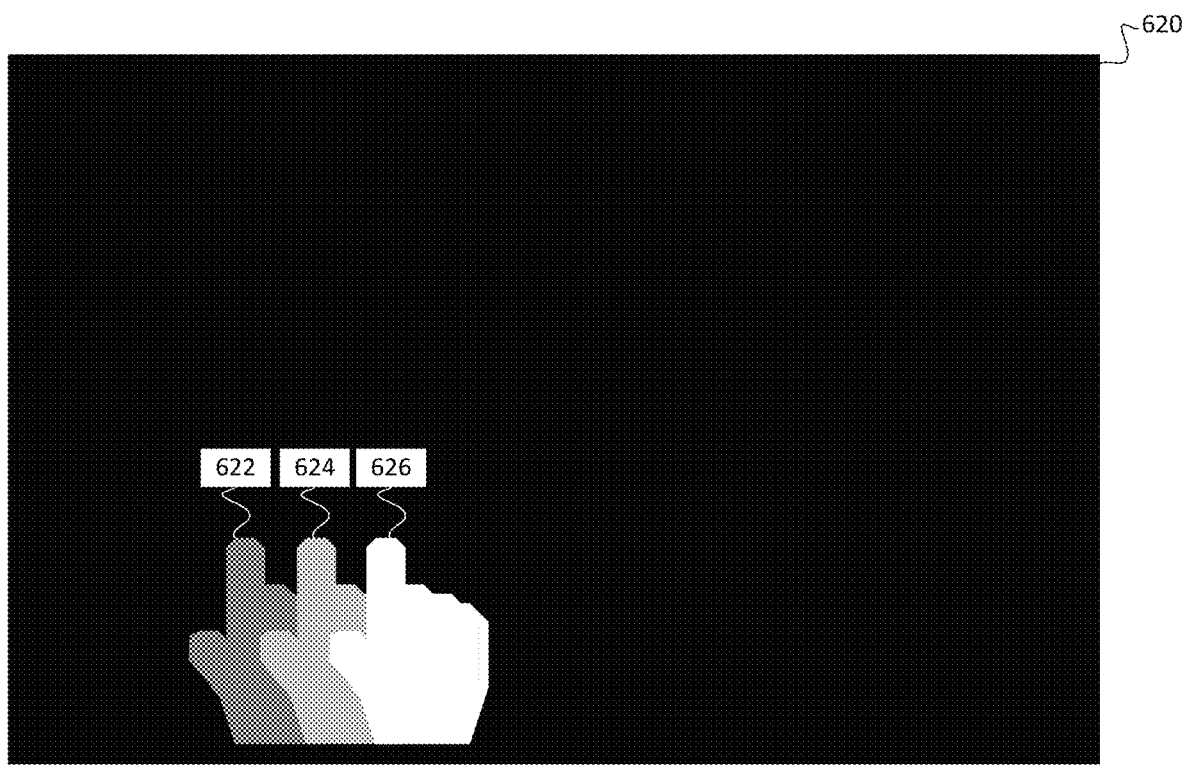
FIG. 6B is a diagram of gesture detection according to some embodiments of the present disclosure.

FIG. 6B is a diagram of gesture detection according to some embodiments of the present disclosure. FIG. 6B depicts an image 620 generated by a processor (e.g., processor 220), in a manner similar to that just described for image 610. Image 620 contains image portion 622, image portion 624, and image portion 626. Image portions 622, 624, and 626 may be generated in a manner similar to that just described for image portions 612, 614, and 616, respectively. However, image 620 may reflect a situation where the user was moving his hand 302 at a slower speed than that described with respect to the capture of images 310, 320, 330, and 340. Alternatively, image 620 may reflect a situation where the image sensor (e.g., image sensor 210) captured images at a faster speed (e.g., higher frame rate) than that described with respect to the capture of images 310, 320, 330, and 340.

As a result of these differences between the capture of the source images on from images 610 and 620 were generated, the image portions 622, 624, and 626 may overlap in pixel positions. As a result, performing the merging process just described with respect to image portions 612, 614, and 616 would result in at least some pixel positions in image 620 being written to during more than one of the copy operations. This situation may be addressed in different ways in various embodiments. For example, the merging process just described with respect to image portions 612, 614, and 616 may be applied as previously described without change. As a result, pixel values will be set (e.g, to pixel value 85) for pixel positions in image portion 622. Then pixel values will be set (e.g, to pixel value 170) for pixel positions in image portion 624. This copying operation may result in overwriting some of the pixel values (e.g., 85) set during the copy operation for image portion 622. Then pixel values will be set (e.g, to pixel value 255) for pixel positions in image portion 626. This copying operation may result in overwriting some of the pixel values (e.g., 85 and/or 170) set during the copy operations for image portions 622 and/or 624. This approach may result in an image 620 substantially as depicted in FIG. 6B. As another example, pixel values in image 620 that are overlapped by image portions 622, 624, and 626 may be set by averaging the pixel values (e.g., 85, 170, and/or 255) in the image portions that overlap for that image position.

In some embodiments, pixel values in images 610 and/or 620 may be set to an average of the pixel values in the intermediate images (e.g., images 510, 520, 530) on which they are based. This averaging may be performed regardless of overlap of image portions 612/614/616 and/or 622/624/626.

Figure 7A:
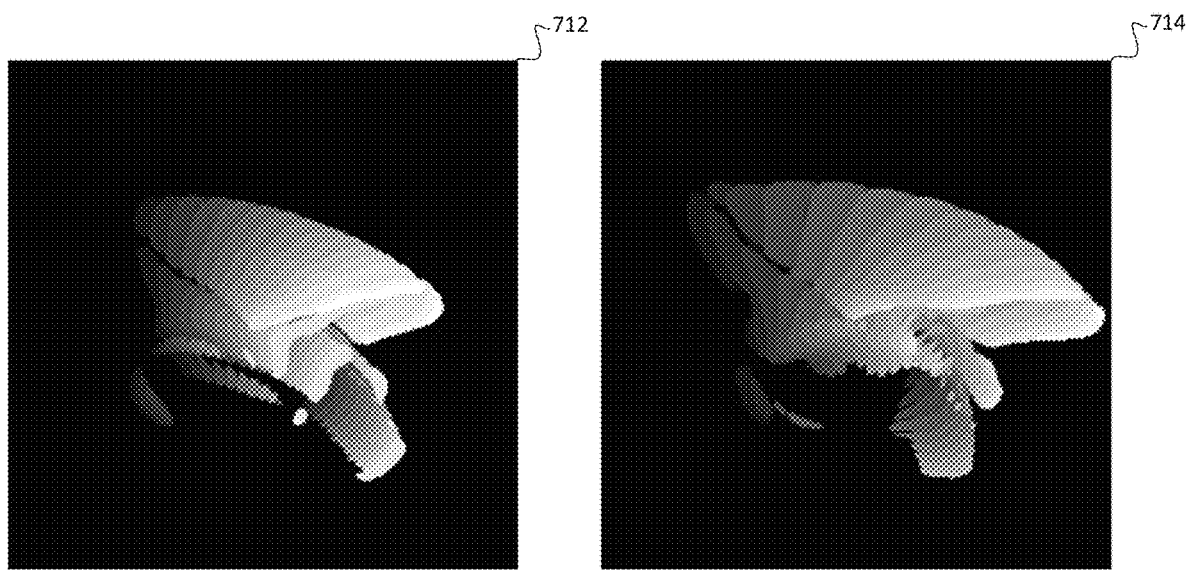
FIG. 7A is a diagram of gesture detection according to some embodiments of the present disclosure.
Figure 7B:
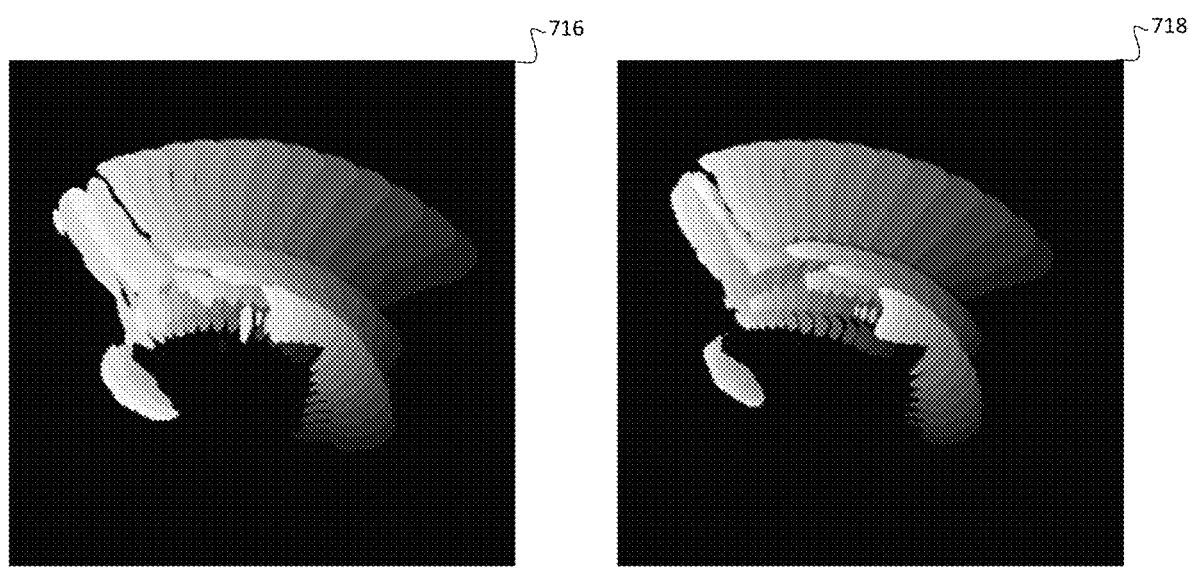
FIG. 7B is a diagram of gesture detection according to some embodiments of the present disclosure.

FIGS. 7A and 7B are diagrams of gesture detection according to some embodiments of the present disclosure. FIG. 7A depicts image 712 and image 714 generated by a processor (e.g., processor 220). FIG. 7B depicts image 716 and image 718 generated by a processor (e.g., processor 220). Images 712, 714, 716, and 718 may be generated using processes similar to those described elsewhere herein.

Image 712 may depict a composite image of a series of approximately 16 source images, in which the user was gesturing with a pointed finger swiping to the right. Image 714 may depict a composite image of a series of approximately 16 source images, in which the user was gesturing with a pointed finger swiping to the right. Image 712 may be generated in a situation where the user moves his finger at a slower rate of speed than in the situation in which image 714 is generated. Image 712 may be generated in a situation where the source images are captured at a higher frame rate than in the situation in which the source images are captured for image 714. Image 712 may be generated in a situation where source images are sampled at a shorter frequency from a video stream than in the situation in which the source images are sampled from a video stream for image 714.

Image 716 may depict a composite image of a series of approximately 16 source images, in which the user was gesturing with a pointed finger swiping to the left. Image 718 may depict a composite image of a series of approximately 16 source images, in which the user was gesturing with a pointed finger swiping to the left. Image 716 may be generated in a situation where the user moves his finger at a faster rate of speed than in the situation in which image 718 is generated. Image 716 may be generated in a situation where the source images are captured at a lower frame rate than in the situation in which the source images are captured for image 718. Image 716 may be generated in a situation where source images are sampled at a longer frequency from a video stream than in the situation in which the source images are sampled from a video stream for image 718.

After generation of image 610, the image 610 can then be used with an artificial neural network structure. In particular, the image 610 can be used with a convolutional neural network.

Image 610 may be used to train an artificial neural network. For example, image 610 may be labeled with one of a predefined set of class values. For instance, image 610 may be labeled "swipe right." As other instances, image 620 may be labeled "swipe right," image 712 may be labeled "swipe right—slow," image 714 may be labeled "swipe right—fast," image 716 may be labeled "swipe left—fast," and image 718 may be labeled "swipe left—slow." The image 610 (as well as images 620, 712, 714, 716, 718) may then be provided as training data during the training of an artificial neural network structure. For example, image 610 after labeling may be provided as training data for the training of a convolutional neural network, using any of the image-based convolutional neural network training algorithms known in the field.

Alternatively, image 610 may be used as input to an already trained artificial neural network structure. For example, if a convolutional neural network was already trained use images generated in a similar fashion to image 610, image 610 could then be provided as input to the convolutional neural network. This may result in the convolutional neural network generating a classification for the image 610. For instance, the convolutional neural network may generate a classification of "swipe right" for the image 610.

Based on the processes just described and described elsewhere herein, it is possible to perform gesture detection on a series of time-related images. Further, it is possible to do so using a convolutional neural network. This is possible, a least in part, because the processes generate a series of images that both isolate motion in the series of time-related images and indicate the time-dependency of the motion using in-image data. Hence, the convolutional neural network can be trained and applied to single-image data, but detect patterns as if the convolutional neural network were actually processing on a series of time-related images. As a result, the processes just described and described elsewhere herein address the problems in the field recognized by the inventors, especially with respect to performing gesture detection using convolutional neural networks and especially with respect to performing gesture detection in embedded systems.

The processes just described and described elsewhere herein provide a number of other improvements to existing techniques in the field.

First, the processes just described and described elsewhere herein provide significant reduction in use of processor, memory, and power resources. Some reduction in the use of processor, memory, and power resources results from the ability to use a convolutional neural network. But additional reduction in the use of processor, memory, and power resources results regardless of the type of artificial neural network used. In particular, the processes described herein allow the submission of image input data with reduced frequency. For example, if a composite image (e.g., as described with respect to image 610) is generated based on every N captured images, then the artificial neural network may only be applied after the capture of every Nth image. In this example, this would result in a reduction by (N−1)/N of the number of times the artificial neural network is applied to image input data (e.g., for composite image generated based on 10 source images, 90% reduction in artificial neural network application). The processes used to generate the composite image may be significantly less processor, memory, and power intensive than the application of the artificial neural network, thus significantly reducing the consumption of those resources. These benefits may be especially beneficial in embedded systems where processor, memory, and power resources are highly limited.

Second, the processes just described and described elsewhere herein provide significant benefits in the accuracy of gesture detection. For example, because the processes perform prediction based on a composite image that captures only motion and time information, the prediction processes are not affected by ancillary information. For instance, existing gesture detection approaches may be affected (i.e., have accuracy reduced) based on variations in skin color, variations in the clothing worn by a user, variations in whether the user is wearing gloves, and the like, and variations in the background space (e.g., clutter, variations in color). These factors impact existing approaches, at least in part because that extraneous information is present in the image data input to the artificial neural network during training and application. But with the processes described herein, some or all of that information is removed (e.g., all static background data is removed, (e.g., set to black)) (e.g., color skin color is removed (e.g., set to white) or muted (e.g., presence of gloves/clothing may impact the outline of motion portions, but not significantly, and will not impact at all the temporal information embodied in the color gradient).

Third, the processes just described and described elsewhere herein provide significant benefits in the efficiency of training the artificial neural network structure. For example, because the feature space of the training data is significantly reduced (e.g., very few colors, no background information), the artificial neural network structure can be trained to a high level of accuracy with fewer input images used during training. This may result in a reduction in consumption of processor, memory, and power resources during training. Further, this may result in a reduction in consumption of processor, memory, and power resources during application of the artificial neural network structure. Namely, because the artificial neural network structure will only reflect information modeling information of interest (e.g., motion and time) and not extraneous information (e.g, user skin color, background information), the neural network structure may be simpler (e.g., have fewer hidden nodes). This may result in faster application of the neural network structure to input image data, which results in less consumption of processor and battery resources, which in turn may result in the ability to train the artificial neural network structure on the embedded system. Further, this may result in a more compact neural network structure (e.g., have fewer hidden nodes), which may result a reduction in the consumption of memory resources (e.g., uses less memory to store the neural network structure on the embedded system).

While the processes just described and described elsewhere herein are described with respect to certain beneficial aspects, such as the ability to use them with a convolutional neural network and/or the ability to use them on an embedded system, the disclosure may be applied differently in various embodiments. For example, the processes disclosed herein may be used with an artificial neural network that is not a convolutional neural network (e.g., with a recurrent neural network). As another example, the processes disclosed herein may be used in any system that performs gesture detection (e.g., not an embedded system). As another example, the processes herein may be used to detect patterns in any series of time-related images (e.g., prediction of pedestrian trajectory by an autonomous vehicle). As another example, the processes described herein may be used to detect patterns in any series of time-related sensor data (e.g., radar data mapped to a two-dimensional field).

Though the foregoing discussion described embodiments using four source images and three intermediate images, the processes described herein can be performed with fewer or more source images and/or intermediate images in various embodiments.

Figure 8:
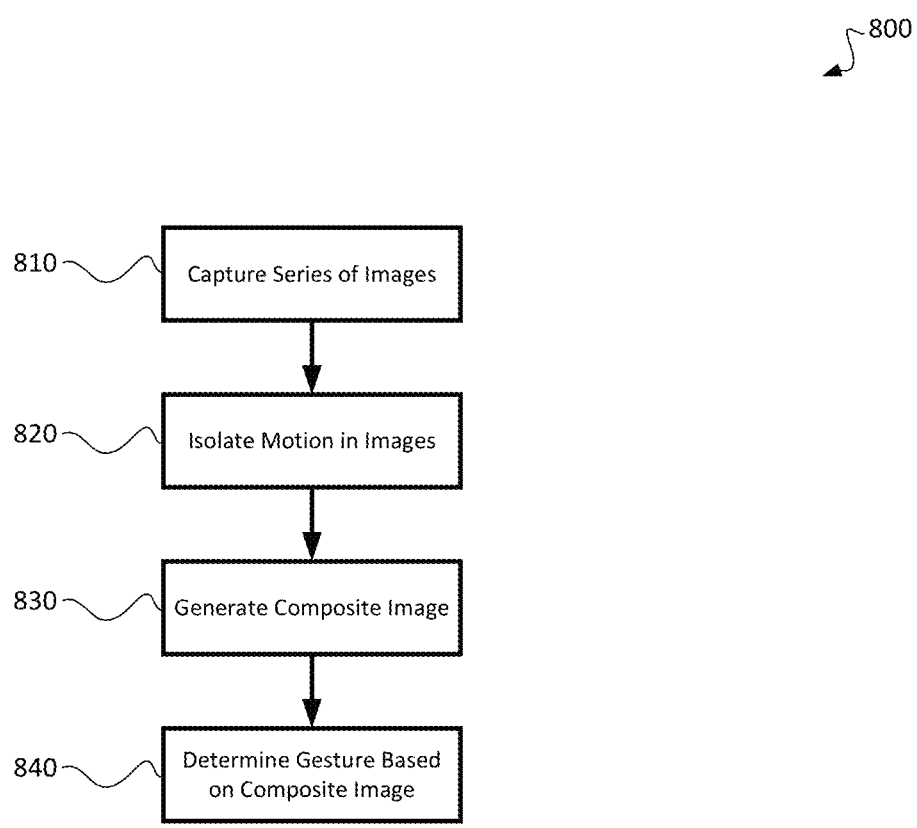
FIG. 8 is a flowchart for a process of gesture detection according to some embodiments of the present disclosure.

FIG. 8 is a flowchart for a process 800 of gesture detection according to some embodiments of the present disclosure. The process 800 may be performed by a system (e.g., system 200).

At block 810, a series of images is captured. The series of images may be captured using an image sensor (e.g., image sensor 210). The series of images may be captured as a series of time-related images (e.g., video frames) as disclosed elsewhere herein.

At block 820, motion is isolated in images. The motion may be isolated in the images using a processor (e.g., processor 220). The motion may be isolated in the images by creating an image with two portions, one portion with pixel values that indicate motion between images (e.g., non-black pixels) and one portion with pixel values that indicate lack of motion between images (e.g., black pixels).

At block 830, a composite image is generated. The composite image may be generated using a processor (e.g., process 220). The composite image may be generated as a composite of the images for which motion was isolated at block 820. The composite image may be generated by applying a color gradient to the images for which motion was isolated at block 820 (e.g., to the portions which indicate motion between images). The composite image may be generated by merging images to which motion was isolated. The composite image may be generated by merging images to which a color gradient was applied.

At block 840, a gesture is determined based on the composite image. The gesture may be determine using a process (e.g., processor 220). The gesture may be determined based on the composite image by applying the composite image generated at block 830 as input to an artificial neural network structure. The gesture may be determined based on the composite image by applying the composite image generated at block 830 as input to an convolutional neural network structure.

Figure 9:
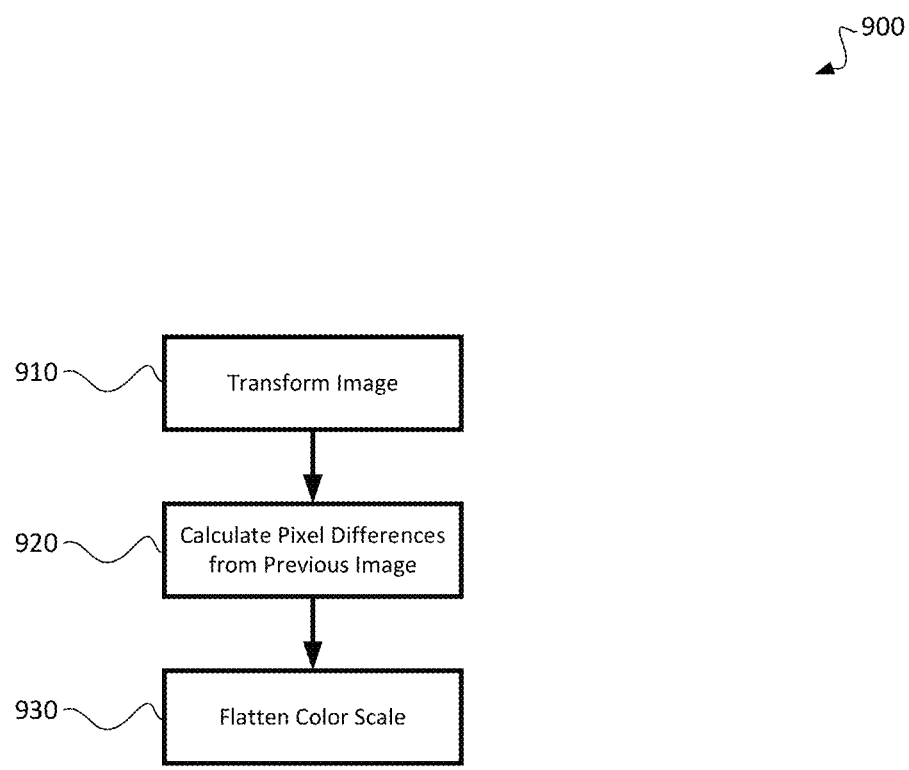
FIG. 9 is a flowchart for a process of gesture detection according to some embodiments of the present disclosure.

FIG. 9 is a flowchart for a process 900 of gesture detection according to some embodiments of the present disclosure. The process 900 may be performed by a system (e.g., system 200). The process 900 may be used to isolate motion in an image in various embodiments.

At block 910, an image is transformed. The image may be transformed using a processor (e.g., processor 220). The image may be transformed by converting a the image from a full color scale to a greyscale. The image may be transformed by reducing the dimensions of the image. The image may be transformed in other ways in various embodiments.

At block 920, pixel differences from a previous image are calculated. The pixel differences may be calculated using a processor (e.g., processor 220). The pixel differences may be calculated by subtracting the pixel value at a given pixel position in a later-in-time image from the pixel value at the same pixel position in an earlier in time image, and then repeating for other pixels. The image may be transformed by reducing the dimensions of the image. The pixel differences may be calculated in other ways in various embodiments.

At block 930, a color scale is flattened. The color scale may be flattened using a processor (e.g., processor 220). The color scale may be flattened by quantizing the pixel values resulting from the pixel differences calculated at block 920. The color scale may be flattened by quantizing the pixel values resulting from the pixel differences calculated at block 920 into two values (e.g., black or white). The color scale may be flattened by quantizing the pixel values resulting from the pixel differences calculated at block 920 into more than two but fewer than 20 values (e.g., any one of 16 different pixel values).

Figure 10:
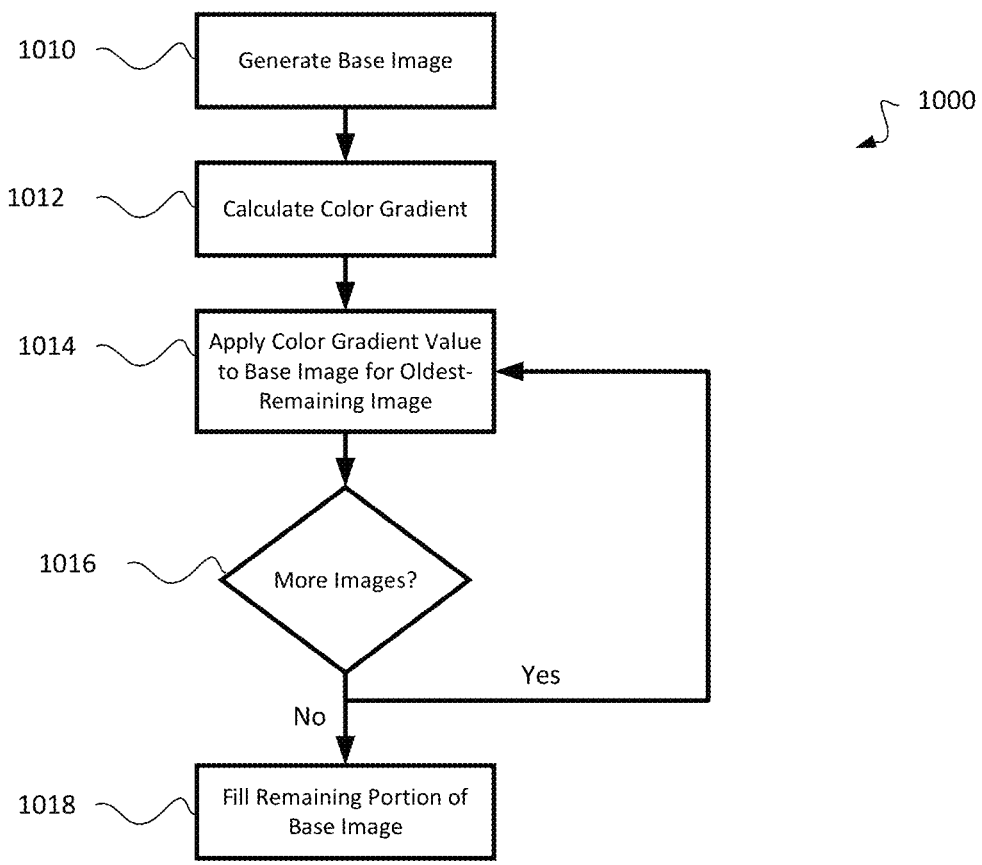
FIG. 10 is a flowchart for a process of gesture detection according to some embodiments of the present disclosure.

FIG. 10 is a flowchart for a process 1000 of gesture detection according to some embodiments of the present disclosure. The process 1000 may be performed by a system (e.g., system 200). The process 1000 may be used to generate a composite image in various embodiments.

At block 1010, a base image is generated. The base image may be generated using a processor (e.g., processor 220). The base image may be generated by generating a pre-defined image (e.g., all black image; all white image). The base image may be generated by generating a blank image. The base image may be generated in other ways in various embodiments.

At block 1012, a color gradient is calculated. The color gradient may be calculated using a processor (e.g., processor 220). The color gradient may be calculated by determining a series of colors to be applied to portions of a series of respective time-related images. The color gradient may be calculated by determining a series of greyscale values. The color gradient may be calculated by determining a series of evenly spaced color intervals. The color gradient may be calculated based on a number of images (e.g., the number of images to be merged into a composite image). The color gradient may be calculated in other ways in various embodiments.

At block 1014, a color gradient value is applied to the base image for an oldest remaining image. The color gradient value may be applied to the base image using a processor (e.g., processor 220). The color gradient value may be applied by selecting a darkest remaining color value from the color gradient. The color gradient value may be applied by applying the color gradient value to locations in the base image that correspond to motion-indicated portions of the oldest-remaining image. The color gradient value may be applied by setting one or more pixels in the base image to a predetermined greyscale value. The color gradient value may be applied in other ways in various embodiments.

At block 1016, a determination is made as to whether there are more images. The determination as to whether there are more images may be made using a processor (e.g., processor 220). The determination may be made based on the number of images previously processed at block 1014. The determination may be made based on the number of images to be merged to generate a composite image. If it is determined that there are more images, then the process continues at block 1014. If it is determined that there are no more images, then the process continues at block 1018. The determination may be made in other way sin various embodiments.

At block 1018, a remaining portion of the base image is filled. The remaining portion of the base image may be filled using a processor (e.g., processor 220). The remaining portion of the base image may be filled by applying a default value (e.g., black; white) to portions of the base image that were not altered during any iteration at block 1014. The remaining portion of the base image may be filled in other ways in various embodiments.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method, comprising:
capturing a series of images;
generating motion isolation information based on the series of images, wherein generating motion isolation information includes flattening pixel values in each image of the series of images based on a predetermined threshold pixel value;
generating a composite image based on the motion isolation information, wherein generating the composite image includes applying a color gradient, wherein applying the color gradient includes determining a series of evenly spaced color intervals based on the number of images in the series of images that are to be merged to generate the composite image, wherein applying the color gradient includes applying the darkest remaining color value of the series of evenly spaced color intervals to the oldest remaining image of the series of images that are to be merged to generate the composite image; and
determining a gesture based on the composite image.

2. The method of claim 1, wherein generating the composite image includes merging the motion isolation information.

3. The method of claim 2, wherein the motion isolation information is a second series of images, and
wherein merging the motion isolation information includes combining portions of more than one of the second series of images to form the composite image.

4. The method of claim 3, wherein the combining portions of more than one of the second series of images includes applying at least one set of overlapping portions of the more than one of the second series of images.

5. The method of claim 4, wherein the at least one set from the at least one set of overlapping portions includes a first portion to which a first color from the color gradient is applied, and a second portion to which a second color from the color gradient is applied.

6. The method of claim 1, wherein determining the gesture based on the composite image includes applying the composite image as input to an artificial neural network.

7. The method of claim 6, wherein the artificial neural network is a convolutional neural network.

8. The method of claim 7, wherein the convolutional neural network is not a recurrent neural network.

9. The method of claim 7, wherein the determining the gesture based on the composite image is performed by the processor of an embedded system.

* * * * *